United States Patent
Ford

[19]

[11] Patent Number: 5,949,883

[45] Date of Patent: *Sep. 7, 1999

[54] ENCRYPTION SYSTEM FOR MIXED-TRUST ENVIRONMENTS

[75] Inventor: Warwick Stanley Ford, Nepean, Canada

[73] Assignee: Entrust Technologies Ltd., Ottawa, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/535,445

[22] Filed: Sep. 28, 1995

[51] Int. Cl.[6] .................................................. H04L 9/00
[52] U.S. Cl. .................. 380/28; 380/29; 380/46
[58] Field of Search ................... 380/28, 29, 49, 380/46, 4, 25, 21

[56] References Cited

U.S. PATENT DOCUMENTS

| | | |
|---|---|---|
| 3,962,539 | 6/1976 | Ehrsam et al. . |
| 4,882,779 | 11/1989 | Rahtgen ............................... 380/24 |
| 5,142,578 | 8/1992 | Matyas et al. ....................... 380/21 |
| 5,179,591 | 1/1993 | Hardy et al. ......................... 380/21 |
| 5,222,136 | 6/1993 | Rasmussen et al. ................. 380/9 |
| 5,416,841 | 5/1995 | Merrick ............................... 380/29 |
| 5,497,420 | 3/1996 | Garneau et al. . |
| 5,504,816 | 4/1996 | Hamilton et al. . |
| 5,504,933 | 4/1996 | Makoto . |
| 5,509,077 | 4/1996 | Moehrmann . |
| 5,638,448 | 6/1997 | Nguyen ............................... 380/29 |
| 5,651,068 | 7/1997 | Klemba et al. ...................... 380/25 |
| 5,659,618 | 8/1997 | Takahashi et al. ................... 380/49 |
| 5,689,566 | 11/1997 | Nguyen ............................... 380/29 |
| 5,850,443 | 12/1998 | Van Oorschot et al. ............ 380/21 |

OTHER PUBLICATIONS

Technical Report No. 1979–1 entitled, "Secrecy, Authentication, and Public Key Systems", pp. 142–145, dated Jun. 1979, by Ralph Charles Merkle, Information Systems Laboratory, Stanford University.

Accredited Standards Committee on Financial Services, Standard X9.17 (Ansi), entitled "Financial Institution Key Management (Wholesale)," published by the American Bankers Association, Apr. 4 1985.

*Primary Examiner*—Salvatore Cangialosi
*Attorney, Agent, or Firm*—Markison & Reckamp, P.C.

[57] ABSTRACT

Encryption frequently needs to be used in communication networks which span different geographical regions which can be considered to be trusted to different extents. According to one embodiment, the invention uses both a strong encryption algorithm and a weak encryption algorithm. A device in the high-trusted region can encrypt using the strong algorithm and can decrypt using either the strong or weak algorithm. A device in the low-trusted region can decrypt with either the strong or the weak algorithm but can encrypt only with the weak algorithm.

9 Claims, 3 Drawing Sheets

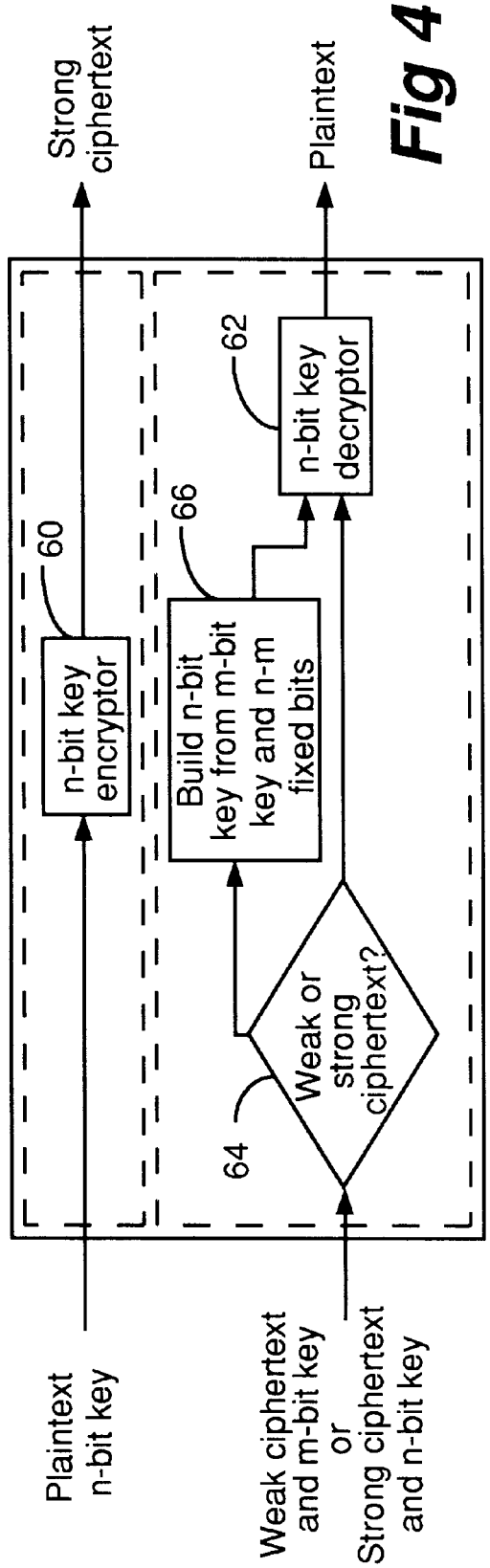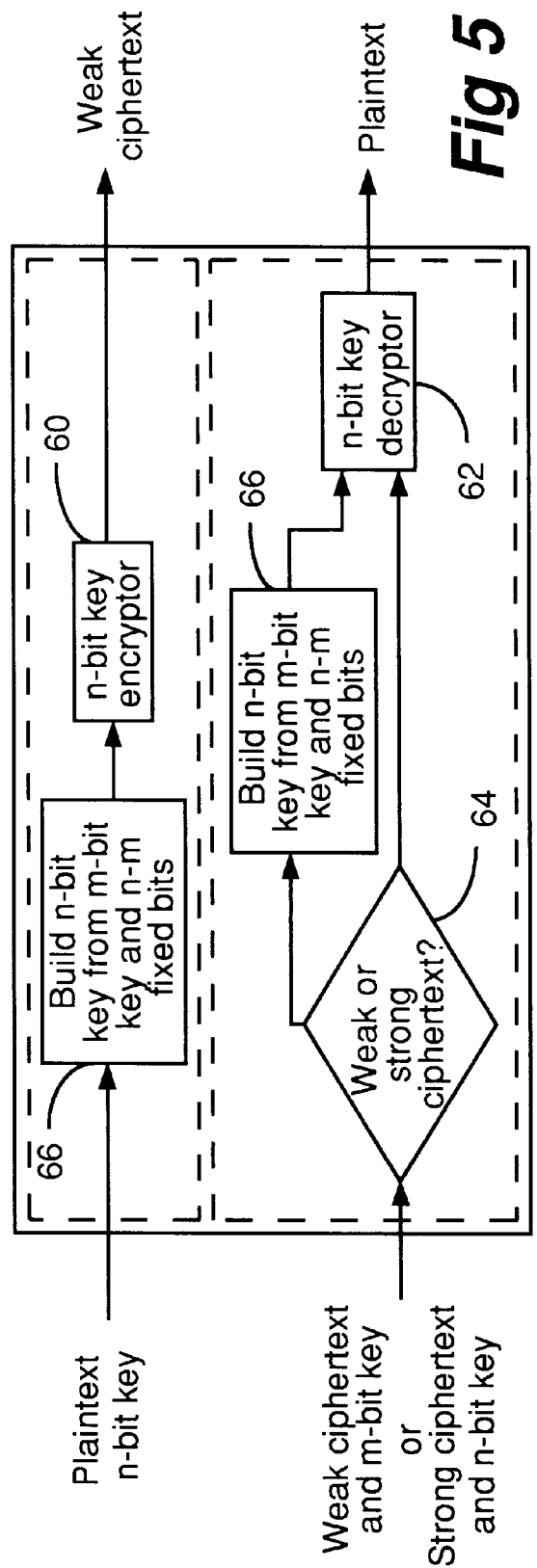

ENCRYPTION SYSTEM FOR MIXED-TRUST ENVIRONMENTS

FIELD OF THE INVENTION

The present invention relates generally to cryptosystems used to protect the confidentiality of encoded information. More specifically, the invention relates to use of cryptosystems in communication networks which span environments of varying levels of trust.

BACKGROUND OF THE INVENTION

In a symmetric cryptosystem, data which needs protecting, called plaintext, is encrypted in one environment to produce ciphertext. The ciphertext is decrypted in another environment to recover the original plaintext. One common key value needs to be supplied to both the encrypting and decrypting processes. The ciphertext can be freely communicated in untrusted environments, since an eavesdropper cannot recover the plaintext because that eavesdropper does not know the key.

A symmetric cryptosystem or encryption algorithm comprises an encryption function and a decryption function. The encryption function operates on plaintext and generates ciphertext. The decryption function operates on ciphertext and generates plaintext. An additional input to both functions is a key which is a data value k bits in length. In a good symmetric encryption process, unless all bits of the key are correctly supplied to the decryption function, no information from the plaintext will be revealed by the decryption function. A well-known example of a symmetric encryption process is the Data Encryption Standard (DES) in which k=56. U.S. Pat. No. 3,962,539, issued Jun. 8, 1976 to Ehrsam et al, describes this symmetric cipher process. FIGS. 1 and 2 illustrate schematically DES encryption and decryption processes respectively.

In co-pending U.S. patent application Ser. No. 08/285,678 filed on Aug. 4, 1994 (Adams) and assigned to the assignee of the present invention, another symmetric encryption system is described.

Any symmetric encryption process can be attacked using an exhaustive key search. The attacking system, which does not initially know the correct key, systematically tries to decrypt a piece of ciphertext using all possible key values until it finds the key value which successfully decrypts. If, in a given encryption system, all key values are equally likely, the chance of an exhaustive key search attack succeeding in a given time depends upon the size of the key space, that is, the number of possible key values, or $2^k$. Therefore, assuming all key values are equally likely, a symmetric encryption process with a given value of k will be stronger than another symmetric encryption process which has a smaller value of k.

Given a symmetric encryption process with a given value of k, it is possible to devise a weaker variant of that symmetric encryption process by always forcing j of the key bits (where j<k) to have a known value. The weaker algorithm has an effective strength the same as that of a symmetric encryption process with a key length of (k−j) bits in which all key values are equally likely.

Encryption frequently needs to be used in communication networks which span different geographical regions which can be considered to be trusted to different extents. For example, one region might be considered a high-trust environment because it is within a country in which there are no concerns about unlawful use of encryption because the laws of that country provide for law-enforcement access to encryption keys under appropriate circumstances. In comparison, another region might be considered a low-trust environment because there is a risk of encryption being used for purposes which may subvert law-enforcement or the protection of national security, and because appropriate legislative or administrative safeguards are not in place.

The usual (prior-art) approach to using encryption in such environments is to have both a strong and a weak encryption algorithm, to restrict products installed in the low-trust environment to products containing only the weak algorithm, but to allow products installed in the high-trust environment to implement both the strong and the weak algorithms. Therefore, information communicated only within the high-trust environment may be protected securely with the strong algorithm, whereas information which enters or leaves the low-trust environment can only be protected with the weak algorithm, allowing authorities to intercept the communications and recover the plaintext if necessary for law-enforcement or national security reasons.

However, the above approach has two major deficiencies. The first is that it unnecessarily exposes sensitive information which is sent from the high-trust environment to both the low-trust environment and the high-trust environment, as such information must be encrypted with the weak algorithm. The current invention overcomes this deficiency, while retaining the objective of guarding against persons within the low-trust environment from using the encryption devices for purposes which may subvert law-enforcement or the protection of national security.

The second deficiency of the usual (prior-art) approach is that it requires an encryptor in the high-trust environment to know, at encryption time, whether the protected information is destined for systems in the high-trust or low-trust environment. This is not always feasible and, in any case, adds substantially to system complexity. The current invention allows the encrypting system to perform the same encryption process regardless of the information destination.

OBJECTS OF THE INVENTION

It is therefore an object of the present invention to provide a method and a system for protecting encoded information transmitted over a communication network which spans both high-trust and low-trust environments using encryption.

It is another object of the present invention to ensure that information which exists as plaintext in the high-trust environment is not unnecessarily exposed to eavesdroppers when communicated in an encrypted form to recipients in either the high-trust or low-trust environment.

It is yet a further object of the present invention to ensure that persons using the encryption systems within the low-trust environment cannot protect information in a way which inhibits recovery of the plaintext from intercepted communications by authorities, if necessary, for law-enforcement or national security reasons.

It is still a further object of the present invention that the encrypting system need not know at encryption time whether the protected information is destined for a high-trust environment or low-trust environment.

SUMMARY OF THE INVENTION

Briefly stated, according to one aspect, the invention is directed to a method of encrypting plaintext into ciphertext in different degrees of security strength. The method comprises steps of the encryptor encrypting the plaintext using a symmetric encryption process of a cryptographic strength commensurate with the degree of trust of the environment in which the encryptor is located, and decryptors in any communication environment decrypting ciphertext originating from any environment using the same symmetric encryption process used by the encryptor regardless of the degree of trust of the environment in which the decryptor is located.

According to another aspect, the invention is directed to an apparatus for encryption and decryption in different degrees of security strength. The apparatus comprises either one or both of a first encryption module for use in encrypting data in high-trust environments which uses a strong cryptographic process and a second encryption module for use in encrypting data in low-trust environments which uses a less strong cryptographic process. The apparatus further comprises a decryption module for use in any environment which decrypts using either a strong or less strong cryptographic process.

BRIEF DESCRIPTION OF THE DRAWINGS

FIG. 4 represents a part of one embodiment of the invention used in the high-trust environment; and FIG. 5 represents another part of the embodiment of the invention used in the low-trust environment.

DETAILED DESCRIPTION OF THE PREFERRED EMBODIMENTS OF THE INVENTION

Figure 2:
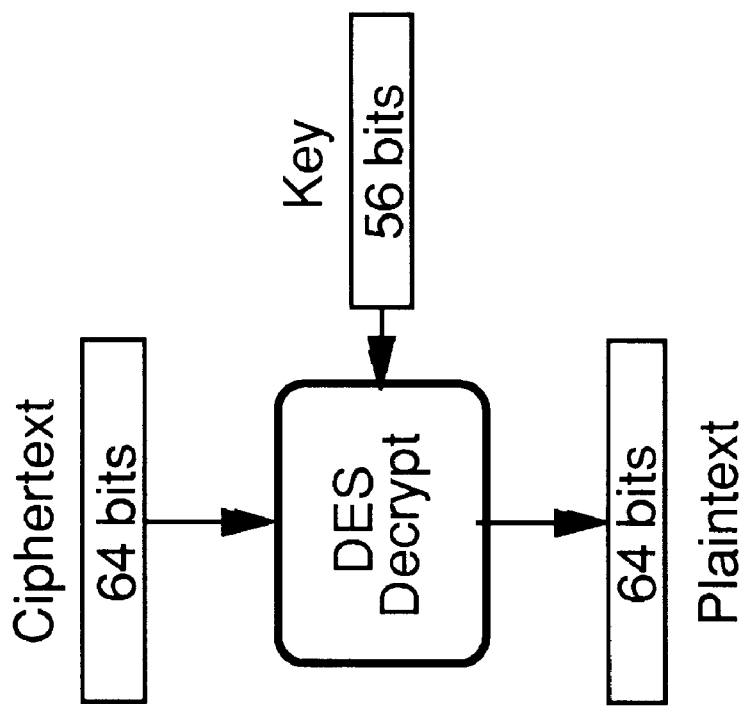
FIGS. 1 and 2 illustrate schematically DES encryption and decryption processes.
Figure 1:
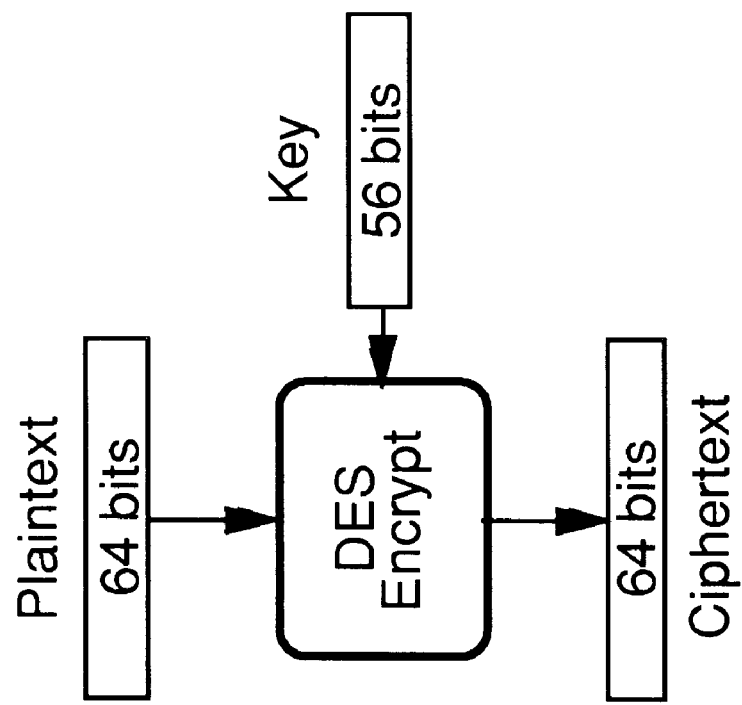
Figure 3:
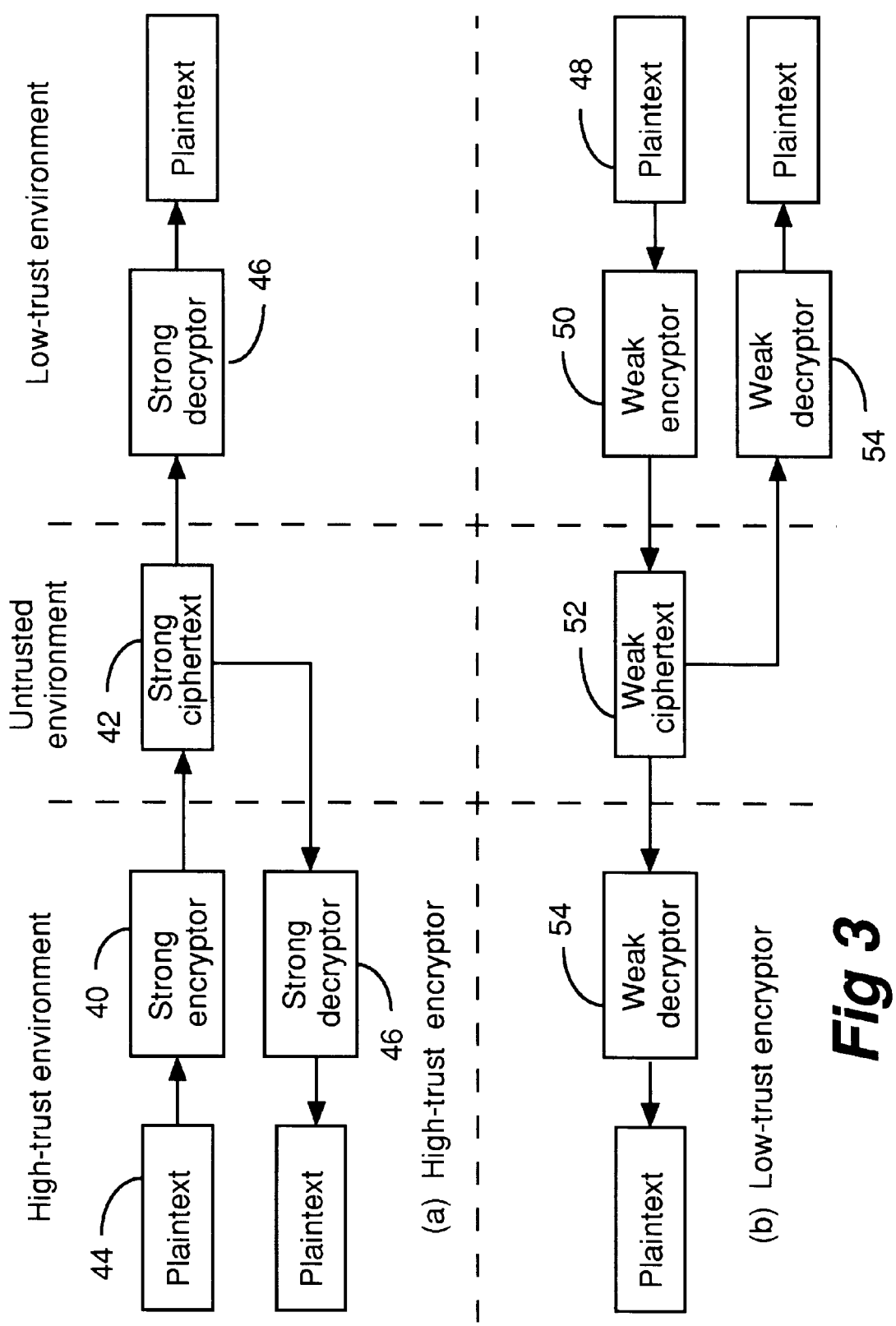
FIG. 3 illustrates processes of encryption and decryption in various environments according to the invention.

FIG. 3 illustrates processes of encryption and decryption in various environments according to the invention. The invention uses both a strong encryption algorithm and a weak encryption algorithm. A high-trusted encryptor in the high-trust environment uses a strong encryptor algorithm 40 to produce a strong ciphertext 42 from a plaintext 44. The strong ciphertext can be decrypted by a strong decryptor algorithm 46 either in the high- or low-trusted environment. A low-trusted encryptor in the low-trusted environment can encrypt plaintext 48 by using only a weak encryptor algorithm 50 to generate a weak ciphertext 52 which can be decrypted by a weak decryptor algorithm 54 in either a high- or low-trusted environment.

FIGS. 4 and 5 illustrate schematically parts of one embodiment of the invention, a part used in the high-trust environment and another in the low-trust environment respectively. In the Figures, there is only one basic encryption algorithm which uses an n-bit key but has a strong mode and a weak mode of operation. The basic algorithm is represented by an n-bit encryptor 60 and an n-bit decryptor 62. In the strong mode, all n key bits are kept secret. In the high-trust environment, the encryption operation uses an n-bit encryptor and produces a strong ciphertext from plaintext and n-bit key. The decryption operation uses an n-bit key decryptor and produces plaintext from a strong ciphertext and n-bit key. The decryption operation can be performed in systems in either the low-trust or high-trust environment, after determining at 64 whether the ciphertext to be decrypted is a strong or weak ciphertext. The weak mode is obtained by forcing n−m of the key bits to publicly known values within the encrypting or decrypting device, giving an effective key length of m bits, n>m. Thus both encryption and decryption processes involve building an n-bit key from an m-bit key and n−m fixed bits as shown by 66. The device installed in the high-trust environment thus contains an n-bit key encryptor and an n-bit key decryptor. In addition, it contains a mechanism for building an n-bit key from an m-bit key and n−m fixed bits. The device which is permitted to be installed in the low-trust environment, on the other hand, is implemented so as to securely force the weak mode to always be used when encrypting, that is to say, the encryption process always uses the key building mechanism 66.

In one embodiment, the basic algorithm uses a 64-bit key for encryption and decryption. In the weak mode it can encrypt using only 40-bit keys. Thus the encryption operation always forces 24 bits of the key to a known value but otherwise behaves like the 64-bit basic algorithm. The code is written to make it practically very difficult to modify either the encrypt or decrypt binary code to make it into a 64-bit encrypt. The key generating module used with a low-trust encryption will also have to force the 24 bits of the key to the fixed value, but otherwise behave like a 64-bit key generating module.

According to the invention, therefore, all protected information originating from the high-trust environment is encrypted using the strong algorithm. This encryption strongly protects this information with respect to possible interception by eavesdroppers in an untrusted environment. However, this strong protection is not a concern to law enforcement or national security authorities as the plaintext is available in the high-trust environment.

All protected information originating from the low-trust environment, on the other hand, is encrypted using the weak algorithm. This facilitates recovery of the plaintext from intercepted communications by authorities, if necessary, for law-enforcement or national security reasons. It therefore eliminates concerns about unlawful or inappropriate use of the encryption systems within the low-trust environment. The user in the low-trust environment cannot protect his information strongly using this device. Certainly there is no way in which two users in the low-trust environment can communicate with each other with strong encryption using this device.

Use of this invention is transparent to users. In particular, it is possible to send one message ciphertext to a mix of high-trust and low-trust locations. Furthermore, a system implementing the invention need not know at encryption time whether the protected information is destined for a high-trust environment or low-trust environment.

The basic encryption algorithm used may be any symmetric encryption algorithm, such as the DES, or the algorithm described in the above-mentioned co-pending application.

What is claimed is:

1. A method of communicating digital data between encryptors and decryptors in communication environments of different degrees of trust comprising steps of:

the encryptor encrypting the plaintext using a symmetric encryption process of a cryptographic strength commensurate with the degree of trust of the environment in which the encryptor is located; and decryptors in any communication environment decrypting ciphertext originating from any environment using the same symmetric encryption process used by the encryptor regardless of the degree of trust of the environment in which the decryptor is located.

2. The method according to claim 1 wherein the symmetric encryption process used by an encryptor in a low trust environment is the same as that used by an encryptor in a high trust environment except that a first secret key used in the low trust environment is forced to be from a smaller key space than a second secret key of an encryptor in high trust environments.

3. The method according to claim 2 wherein the encryptor in the high trust environment uses a second secret key which includes an n-bit random secret key and an encryptor in a low trust environment uses the first secret key obtained by combining and m-bit random secret key with n−m publicly known fixed bits where n and m are integers and n>m.

4. The method according to claim 2 wherein the encryption process is DES.

5. An apparatus for encryption and decryption in different degrees of security strength comprising:
  either one or both of a first encryption module and a second encryption module, the first encryption module being for use in encrypting data in high-trust environments which uses a strong cryptographic process, and the second encryption module being for use in encrypting data in low-trust environments which uses a less strong cryptographic process; and
  a decryption module that receives encrypted information from either the first and second encryption modules, for use in any environment which decrypts using either a strong or less strong cryptographic process.

6. The apparatus according to claim 5 wherein the cryptographic process used in the encryption modules for a low-trust environment and a high-trust environment is the same symmetric encryption process except that a first secret key used in the low trust environment is forced to be from a smaller key space than a second secret key of the encryption module for high trust environments.

7. The apparatus according to claim 6 wherein the first encryption module for a high trust environment uses an n-bit random secret key and the second encryption module for a low trust environment uses a key obtained by combining an m-bit random secret key with n−m publicly known fixed bits where n and m are integers and n>m.

8. The apparatus according to claim 6, wherein the encryption process is DES.

9. An apparatus for encryption and decryption in different degrees of security strength comprising:
  a high trust device including,
    an n-bit key encryptor to facilitate strong encryption,
    an n bit key decryptor to facilitate strong decryption, and
    an m bit key decryptor to facilitate weaker decryption, where n>m;
  a low trust device, operatively coupled to the high trust device, including
    an m bit encryptor to facilitate weak encryption,
    an n bit key decryptor to facilitate strong decryption of information from the n-bit encryptor and
    an m bit key decryptor to facilitate decryption of information from the m bit key encryptor,
    such that at least some protected information originating from the high trust device is encrypted using the strong n bit key, at least some protected information originating from the low trust device is encrypted using the lower m bit key and the low trust device decrypts both strong encrypted information from the high trust device and weaker encrypted information from another low trust device.

* * * * *